United States Patent [19]

Tupper

[11] 4,427,934

[45] Jan. 24, 1984

[54] CURRENT LIMITER FOR A LOAD COMMUTATED INVERTER

[75] Inventor: Leland C. Tupper, Schenectady, N.Y.

[73] Assignee: General Electric Company, Salem, Va.

[21] Appl. No.: 343,916

[22] Filed: Jan. 29, 1982

[51] Int. Cl.³ .............................................. H02P 5/40
[52] U.S. Cl. .................................. 318/723; 318/798; 318/806
[58] Field of Search ............... 318/723, 798, 806, 803, 318/807–811

[56] References Cited

U.S. PATENT DOCUMENTS

| | | | |
|---|---|---|---|
| 3,601,674 | 8/1971 | Joslyn | 318/318 |
| 3,851,234 | 11/1974 | Hoffman | 318/800 |
| 4,230,979 | 10/1980 | Espelage et al. | 318/721 |
| 4,263,557 | 4/1981 | Jarvinen | 318/341 |
| 4,276,505 | 6/1981 | Bose | 318/802 |
| 4,281,276 | 7/1981 | Cutler et al. | 318/810 |

*Primary Examiner*—David Smith, Jr.

*Attorney, Agent, or Firm*—Arnold E. Renner; Ormand R. Austin

[57] ABSTRACT

A current limiter for a load commutated inverter-synchronous motor drive including a source side AC to DC converter (12) and a load side DC to AC converter (14) coupled via a DC link circuit including an inductor (16) wherein a torque reference signal (TORQUE REF) generated for controlling both the converters is limited in response to the peak value $\psi_{MAX}$ of the pseudo flux waveform ($\psi_{ab}$, $\psi_{bc}$, $\psi_{ca}$) which is derived from the integral ($\int$) of the motor terminal voltage ($v_{ab}$, $v_{bc}$, $v_{ca}$) in order to limit the motor stator current $I_s$ to a value corresponding to the region of peak output torque $T_{MAX}$ obtainable for the motor field current $I_f$ applied. Control of both the source side converter (12) and the load side converter (14) by the torque reference signal operates to control the magnitude of the current $I_L$ in a DC link circuit which corresponds to the motor stator current $I_s$ as well as the frequency of the AC power applied to the motor.

22 Claims, 7 Drawing Figures

CURRENT LIMITER FOR A LOAD COMMUTATED INVERTER

REFERENCED MATERIAL

Reference is made to a microfiche appendix which sets forth a computer program listing including that which is applicable to the present invention. Included are 8 microfiche containing a total of 458 frames.

CROSS REFERENCE TO RELATED APPLICATIONS

This application is related to the following related U.S. patent applications which are assigned to the assignee of the present invention and are herein meant to be incorporated by reference:

U.S. Ser. No. 306,200 entitled, "Line-to-Line Voltage Reconstruction For Synchronizing Thyristor Power Converter", filed on Sept. 8, 1981 in the names of Paul M. Espelage, et al.;

U.S. Ser. No. 333,933 entitled, "Flux Feedback Firing Control For A Load Commutated Inverter", filed on Dec. 23, 1981 in the names of D. L. Lippitt, et al.;

U.S. Ser. No. 333,929 entitled, "Cross-Tied Current Regulator For Load Commutated Inverter Drives", filed on Dec. 23, 1981 in the names of Loren H. Walker, et al.; and U.S. Ser. No. 322,741 entitled, "Terminal Voltage Limit Regulator For A Load Commutated Inverter", filed on Nov. 19, 1981, in the name of L. C. Tupper.

BACKGROUND OF THE INVENTION

This invention relates generally to firing circuits for thyristor power conversion systems and more particularly to an improved means for controlling the operation of a thyristor converter AC motor drive system including a polyphase synchronous motor supplied from a polyphase alternating current source.

Many circuits and systems are known for controlling the conductivity of controlled rectifiers utilized in various types of converters for supplying electrical power to a load, such as an AC motor, from a polyphase alternating current (AC) source. The type of rectifier used generally controls the type of control utilized, but by far the most common controlled rectifier used today is the thyristor of the silicon controlled rectifier type. A thyristor becomes conductive with the simultaneous application of a forward bias voltage and a signal applied to its gate electrode and thereafter reamins conductive until the anode current falls below the value required to hold the thyristor in the conductive state.

Whereas motor control systems employing thyristors are known which have been implemented using analog control techniques, a typical example being U.S. Pat. No. 4,230,979, entitled, "Control Current Inverter and Motor Control System", Paul M. Espelage, et al., Oct. 28, 1980; attention has been and is presently directed to digital type of control techniques, examples of which are disclosed in: U.S. Pat. No. 3,601,674, entitled, "Control System For Firing SCR's In Power Conversion Apparatus", John A. Joslyn, et al., Aug. 24, 1971; U.S. Pat. No. 4,263,557, entitled, "Power Converter Control", Willard B. Jarvinen, Apr. 21, 1981; and U.S. Pat. No. 4,276,505, entitled, "Microcomputer Base Control Apparatus For A Load Commutated Inverter Synchronous Machine Drive System", Bimal K. Bose, June 30, 1981. The teachings of these patents are also intended to be incorporated herein by reference for enabling one skilled in the art to understand the present invention without the disclosure of extraneous and irrelevant material.

In a load commutated inverter (LCI) synchronous motor drive typically including a source side AC to DC converter and a load side DC to AC converter coupled together by means of a DC link circuit for supplying AC power to a motor load from a polyphase AC source, the torque developed by the motor is a function of stator current which is supplied by the load side inverter and the DC link circuit as well as the field current, the latter being supplied from a field excitation source. For a given field current, the torque increases with stator current until a peak is obtained. Thereafter further stator current increases result in a decrease in torque due to the excessive demagnetization of the field caused by the increasingly leading power factor necessary to obtain thyristor commutation. Additionally, the torque peak with stator current is also a function of field current; however, a direct measure of field current is generally not available.

Accordingly, during normal operation of an LCI motor control system, it is desirable to limit the stator current to a value corresponding to the peak torque region for the field current applied and failure to provide such as limit can result not only in a reduction in operational efficiency, but also in undesirable control ambiguity.

SUMMARY OF THE INVENTION

It is an object of the present invention, therefore, to provide an improved system for controlling the power applied to an AC load.

It is another object to provide an improved system for controlling the power applied to an AC motor.

It is a further object of the present invention to provide an improved system for controlling the power applied to a synchronous machine by means of a thyristor converter.

Still a further object of the present invention is to provide an improved system for limiting the stator current of a synchronous motor supplied by a load side DC to AC converter to a value corresponding to the peak torque which can be provided under the existing operating parameters.

The foregoing and other objects are achieved in accordance with the present invention through the provision of a motor drive system comprised of a load commutated DC to AC converter employing a plurality of sequentially fired thyristors, preferably in the form of a bridge, which is adapted to supply AC current of a predetermined amplitude and frequency to a polyphase synchronous motor load from a polyphase AC source via an intermediate polyphase AC to DC converter and a DC link circuit. Through the establishment of a torque reference (i.e., a command signal) a current reference signal and a firing angle reference signal are generated to respectively control the DC current in the link circuit and to control the firing angle of the DC to AC converter. The torque reference signal is furthermore limited in response to the peak value of at least on pseudo flux waveform which is derived from the integral of the motor polyphase terminal voltages in order to limit the motor's stator current through control of the DC current in the link circuit to a value corresponding to the region of peak output torque obtainable for a particular field current applied.

BRIEF DESCRIPTION OF THE DRAWINGS

While the present invention is described in particularity for providing a basis of the claims annexed to and forming a part of this specification, a better understanding of the invention can be had by reference to the following description taken in conjunction with the accompanying drawings in which:

DESCRIPTION OF THE PREFERRED EMBODIMENTS

Figure 1:
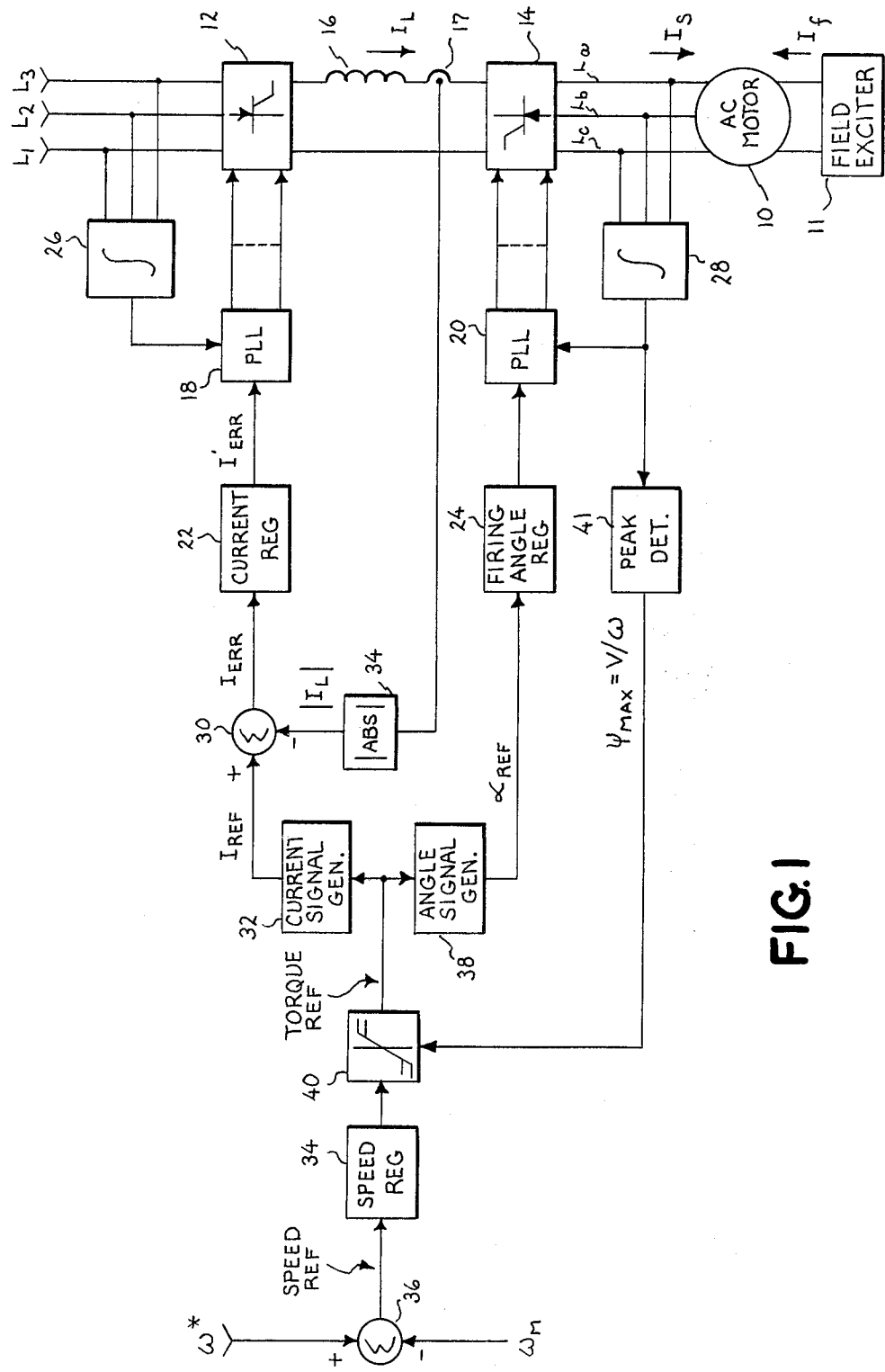
FIG. 1 is a block diagram illustrative of an AC motor drive incorporating the present invention.

Referring now to FIG. 1, there is illustrated in block diagram form an alternating current (AC) motor drive system for controlling an AC machine load 10, and more particularly a synchronous motor, from a three phase ($3\phi$) alternating current (AC) power source, not shown, coupled to line terminals $L_1$, $L_2$ and $L_3$ in accordance with the operation of an AC to DC source side converter unit 12 and a DC to AC load side converter 14, often referred to as an inverter. The source side converter unit 12 operates to convert the three phase AC power into a source of variable DC current $I_L$ which is coupled by way of a DC link circuit including an inductor 16 to the load side converter 14 which in turn operates to generate an AC current $I_s$ of variable magnitude and frequency which is supplied to the stator, not shown, of the motor 10 by means of the three phase lines $L_a$, $L_b$ and $L_c$. In addition, the AC motor 10 has a field current $I_f$ applied thereto from a field excitation circuit shown by reference numeral 11. The system up to this point includes the same basic power components as set forth in the aforementioned Bose U.S. Pat. No. 4,276,505.

Both converters 12 and 14 are implemented by means of well known phase controlled thyristor bridge circuits, not shown, whose conductivity is controlled by suitable means such as respective phase locked loop (PLL) fire control circuits 18 and 20. The firing angles of the thyristors in converter 12 are primarily controlled by output of a current regulator 22 while the firing angles of the thyristors in the converter 14 are primarily controlled by the output of the firing angle regulator 24.

The firing of the thyristors of the two units 12 and 14, moreover, is synchronized with the respective three phase line voltages $L_1$, $L_2$, $L_3$ and $L_a$, $L_b$, $L_c$ and typically utilize a waveform comprising the integration of respective AC line to line voltages, the zero crossings of which are used to form a synchronizing pulse train having a frequency six times the fundamental frequency; i.e., the line frequency. Integration circuitry for synchronizing the phase lock loops 18 and 20 typically comprises the circuitry shown and described in the aforementioned cross referenced application, U.S. Ser. No. 300,200 entitled, "Line-to-Line Voltage Reconstruction For Synchronizing Thyristor Power Converter". A simplified circuit is shown, however, in FIG. 3 and will be discussed subsequently.

Normally, variations in desired motor torque in a system of the type shown in FIG. 1 are obtained by appropriate changes to the DC link current $I_L$ flowing through the inductor 16 between the source side converter 12 and the load side converter 14. Control of the link current $I_L$, moreover, is primarily under the control of the source side converter 12 in response to a current error signal $I_{ERR}$ generated at a summing junction 30 resulting from the comparison of a current reference signal $I_{REF}$ provided by a current signal generator 32 and the absolute value of the link or motor current $I_L$, the latter being obtained from a current sensor 17 and an absolute magnitude circuit 34. The input of the current signal generator 32 comprises a torque reference signal generated by a speed regulator circuit 34 which responds to a speed reference signal provided at the output of a summing junction 36. The summing junction 36 compares a signal corresponding to the desired speed $\omega^*$ against the actual motor speed signal $\omega_M$. These signals are generated in any convenient well known manner. Additionally, as shown in FIG. 1, the torque reference signal is also applied to an angle signal generator 38 which provides an output corresponding to an angle reference signal $\alpha_{REF}$ which is applied to the firing angle regulator for controlling the phase lock loop 20. The block diagram of FIG. 1 also discloses the inclusion of a limiter circuit 40 which operates in response to inputs from the speed regulator circuit 34 and a peak detector circuit 41 coupled to the integrator circuit 28. It is to the limiter circuit 40 that the present invention is directed, as will now be explained.

Figure 2A:
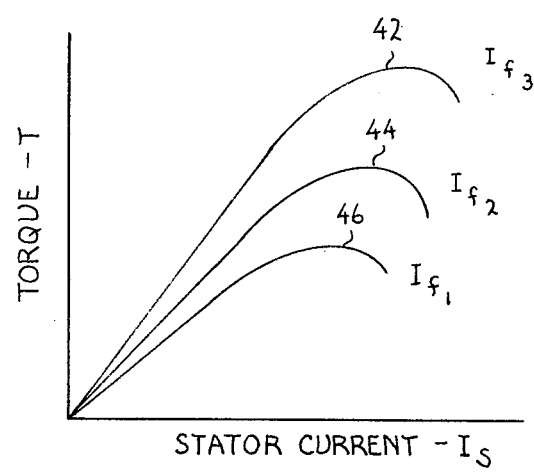
FIGS. 2A through 2C are diagrams of motor characteristic curves helpful in understanding the present invention.

As has been noted earlier, the nature of a load commutated inverter synchronous motor drive is such that the torque developed by the motor, for example the motor 10, is a function of stator current $I_s$ and field current $I_f$. As shown in FIG. 2A, for a given field current, three of which are shown as $I_{f1}$, $I_{f2}$, $I_{f3}$, the torque T increases with the stator current $I_s$ until a peak is obtained. Further stator current increases result in a decrease in torque which occurs due to the demagnetization of the field caused by the increasingly leading power factor necessary to obtain commutation.

Accordingly, it becomes desirable to limit the stator current $I_s$ to a value corresponding to the peak torque region of the curves 42, 44, 46 shown in FIG. 2A. The limiter circuit 40 shown in FIG. 1 acts to provide this function. Implied in the above discussion is a requirement to also limit stator current $I_s$ as a function of field current $I_f$. In some applications, such as with a rotating exciter, a direct measure of the field current is not available. Furthermore, since it is really motor flux and not just a field current that determines the limiting value of stator current, even knowing the field current does not give complete information, particularly during transient conditions. By the utilization of the limiter circuit 40 which operates in response to a signal from the integrator circuit 28, a desired stator current limit can be achieved both transiently and in steady state operation without requiring any direct measurement of the field current. This occurs because the integral of the line to line motor terminal voltage is conveniently available from the integrator circuit 28. Furthermore, the peak value of this integral is a reasonable approximation of the peak value of the motor flux $\psi_{MAX}$ which can be expressed in volts/hertz ($V/\omega$).

Figure 2B:
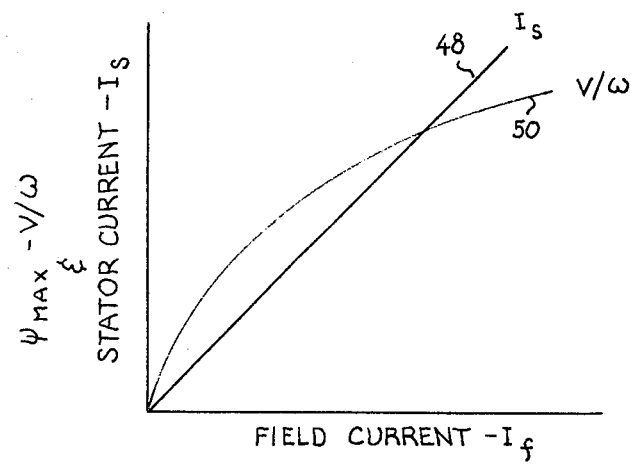

With reference now to FIG. 2B, shown therein are curves, at peak torque, of the stator current $I_s$ and peak flux $\psi_{MAX}$ expressed as $V/\omega$ which are indicated by reference numerals 48 and 50, respectively, showing their respective relationships to field current. It is apparent from FIG. 2 that expressions for both stator current $I_s$ and peak flux or $V/\omega$ expressed in terms of field current $I_f$ can be combined to eliminate $I_f$ and provide a unique expression of $I_s$ as a function of $V/\omega$ at the maximum torque point for any field current. For those applications for which the expected range of field currents is small, the curve 50 can be approximated by a straight line segment providing a relationship between $I_s$ and $V/\omega$ which can be expressed in a single straight line of the form:

$$I_{smax} = a(V/\omega) + b \quad (1)$$

where the coefficients a and b are determined by the particular section of the curve 50 being approximated.

Figure 2C:
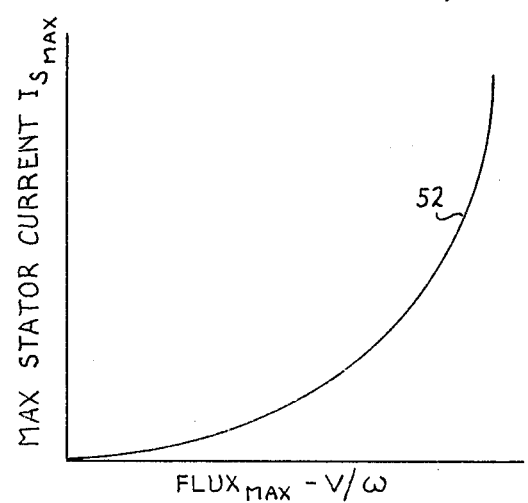

A more general approach is contemplated using a non-linear function which results in expression which can be used over the whole operating range of field current. This expression is of the form:

$$I_{smax} = a + b(V/\omega) + c(V/\omega)^6 \quad (2)$$

where a, b and c are coefficients of a curve 52 such as shown in FIG. 2C.

Accordingly, since the stator current $I_s$ is derived from and is a function of the link current $I_L$ and is controlled in accordance with the torque reference signal, the peak detector circuit 41 coupled between the load side integrator 28 and the limiter circuit 40 causes the value of the torque reference signal to be limited in accordance with the maximum value of the pseudo flux signal $\psi_{MAX}$ which is the peak value of the voltage integral provided by the integrator 28. Thus the torque reference signal is limited to the maximum value of torque that can be obtained for any value of $\psi_{MAX}$.

Figure 3:
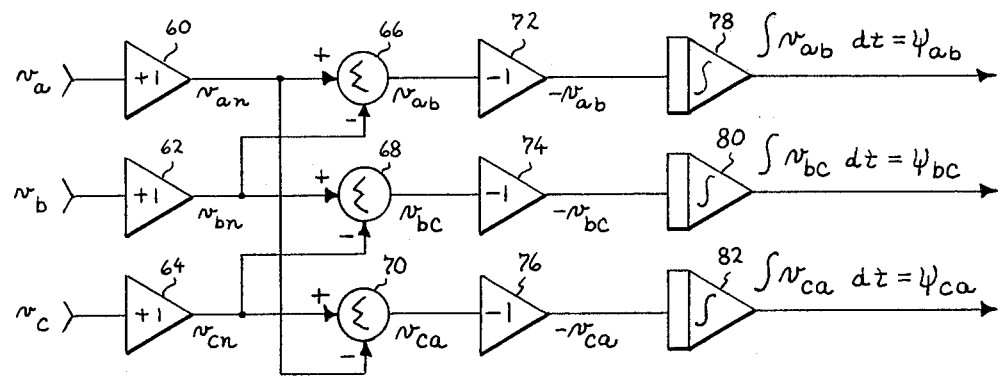
FIG. 3 is an electrical block diagram illustrative of the manner in which pseudo flux waveforms of the motor shown in FIG. 1 are generated.

Referring now to FIG. 3, there is shown a simple means of obtaining a pseudo flux waveforms of the motor 10 from the phase voltages appearing on lines $L_a$, $L_b$ and $L_c$ coupled between the motor 10 and the load side converter 14. As shown in FIG. 3, the phase voltages $v_a$, $v_b$ and $v_c$ are applied to respective unity gain buffer amplifiers 60, 62 and 64 whose outputs correspond to phase to neutral voltages $v_{an}$, $v_{bn}$ and $v_{cn}$. These three phase to neutral voltages are applied to the (+) terminals of respective summing junctions 66, 68 and 70 from which line to line voltages or simply line voltages $v_{ab}$, $v_{bc}$ and $v_{ca}$ are developed by applying the phase to neutral voltage $v_{bn}$ to the (−) terminal of summing point 66, the phase to neutral voltage $v_{cn}$ to the (−) terminal of the summing point 68 and the phase to neutral voltage $v_{an}$ to the (−) terminal of summing point 70.

The three line to line voltages $v_{ab}$, $v_{bc}$ and $v_{ca}$ thus generated are coupled to respective inverter amplifiers 72, 74 and 76, the outputs of which are supplied to integrators 78, 80 and 82 which also perform a signal inversion to provide three pseudo flux waveform signals $\psi_{ab}$, $\psi_{bc}$ and $\psi_{ca}$ as disclosed in above reference related application U.S. Ser. No. 300,200 entitled, "Line-to-Line Voltage Reconstruction For Synchronizing Thyristor Power Converter". When desirable, the three pseudo flux waveforms can be further processed in accordance with the teachings of U.S. Ser. No. 300,200 to remove any commutation notches.

When any one or all of the pseudo flux waveforms are applied to the peak detector 41 the torque reference signal will be limited by the limiter circuit 40 to effect a stator current $I_s$ which maximizes the torque developed by the motor 10.

As has been disclosed in the above cross referenced application Ser. No. 322,741 entitled, "Terminal Voltage Limit Regulator For A Load Commutated Inverter", the nature of a synchronous machine is that the terminal voltage at a given value of the motor field current is also very sensitive to the load current when the machine is not tied to a nominally fixed voltage bus, as in the case of this invention where the motor 10 is driven by a current source comprised of DC to AC load side converter 14. Under such conditions, particularly when operating near rated load conditions of the motor 10, a small drop in the DC link current can result in an appreciable rise in motor terminal voltage. In absence of such an unacceptably high terminal voltage condition, the thyristors in the load side converter 14 are fired as "late as possible" prior to the crossings of the phase voltages on lines $L_a$, $L_b$ and $L_c$ in order to effect commutation, which is well known, it takes both voltage and time to accomplish. This usually results in a power factor in the order of 0.9 leading. If, however, operation results in an undesirably high motor terminal voltage, the current signal generator 32 and the angle signal generator 38 can be configured as taught in U.S. Ser. No. 322,741 to provide an operational shift wherein control is transferred to a form where the DC link current $I_L$ is used to control motor terminal voltage and the firing angle of the inverter 14 is used to control the torque whereas the opposite normally occurs, i.e. the converter 12 controls the torque. This involves an inclusion of a further current limiting function in the output of the current signal generator 32 simultaneously coupled with a change in the thyristor firing strategy as controlled by the angle signal generator 38 from a "fire as late as possible" strategy to an advancement of the thyristor firing angle in the motoring mode when motor terminal voltage exceeds a predetermined reference. In the braking mode, however, a "fire as early as possible" firing strategy is utilized.

Figure 4:
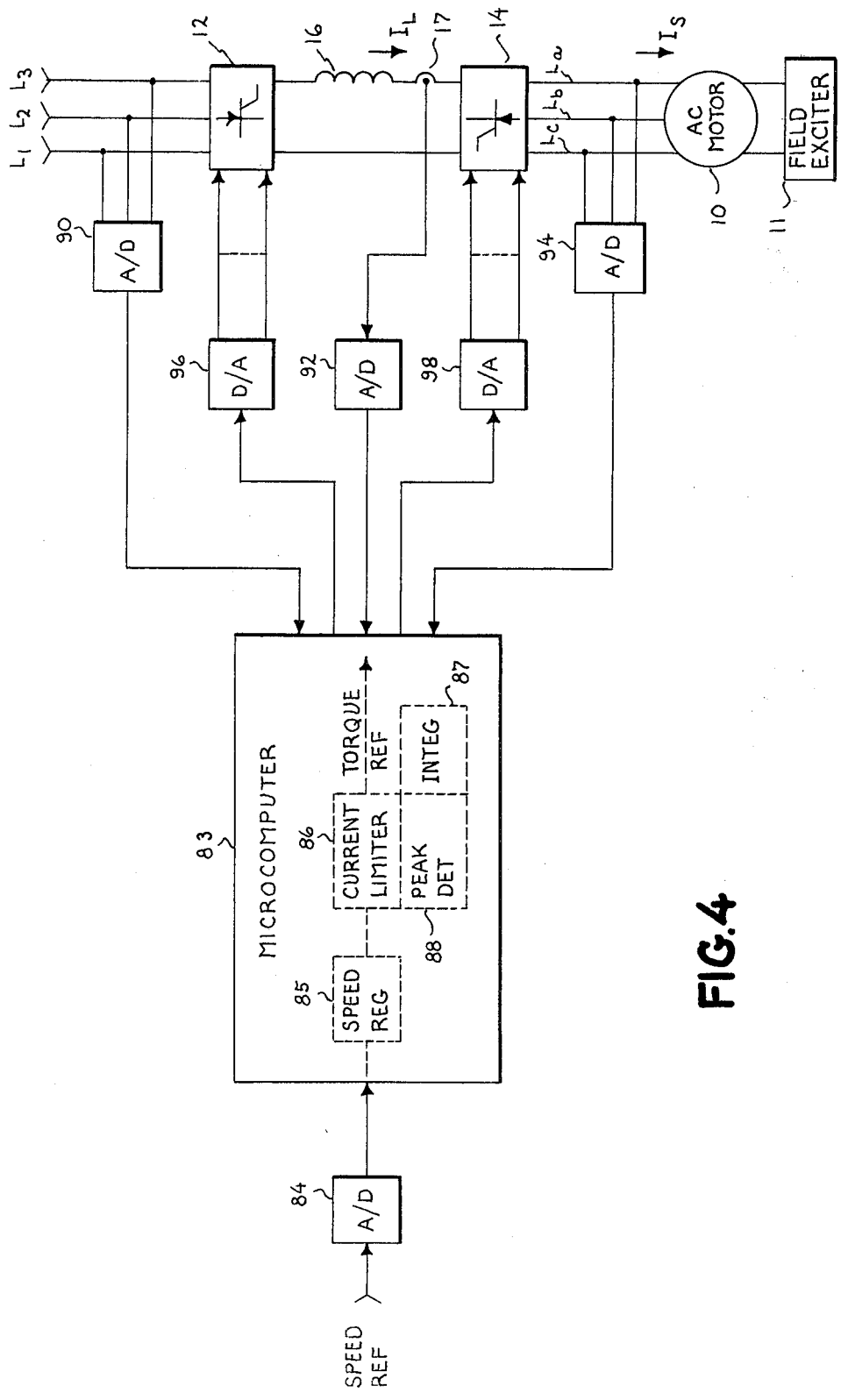
FIG. 4 is a block diagram illustrating the implementation of the present invention by a microcomputer.

While the block diagram shown in FIG. 1 discloses a hardware implementation of the subject invention, the stator current limiting function is preferably implemented in software on an Intel 8086 microcomputer, using a PLM86 language. Referring now to FIG. 4, there is illustrated in block diagram form the basic implementation of the present invention using a microcomputer. As shown, a speed reference signal generated for example as shown in FIG. 1, is furnished to a 8086 microcomputer 83 by way of an input/output port, not shown, connected to an analog to digital A/D converter 84. If the speed reference signal were to be presented in digital form, the A to D converter 84 would not be necessary. As a part of its function, the microcomputer 83 generates the torque reference signal of FIG. 1 using speed regulator stator current limiting, line to line voltage integration, and peak detector software routines as indicated by the dashed line blocks 85, 86, 87 and 88. The microcomputer 83 receives inputs from and provides outputs to the power circuitry which is shown identically to that illustrated in FIG. 1, that is, three power lines $L_1$, $L_2$ and $L_3$ supply a source side converter 12 which is connected to the load side converter 14 by way of a link circuit including an inductor 16 and a current sensor 17. The load side inverter 14 furnishes power to the motor 10 by way of lines $L_a$, $L_b$ and $L_c$.

Synchronization information for the source side converter 12 is furnished by a suitable A to D converter 90 which is connected to the lines $L_1$, $L_2$ and $L_3$. The current feedback for the signal $I_L$ is shown including an A/D converter 92 connected to the current sensor 17. Connected to the lines $L_a$, $L_b$ and $L_c$ is an additional A/D converter 94 which provides the microcomputer 83 with the motor phase voltages $v_a$, $v_b$ and $v_c$ utilized in fashion as shown in FIG. 3 to determine the peak of the pseudo flux waveforms from the motor 10.

The microcomputer 83 employs these various input signals in a functional manner as described with respect to FIG. 1 and provides suitable outputs to control thyristors of both the source side converter 12 and the load side converter 14. In FIG. 4 this is illustrated as outputs provided respectively to two input/output ports coupled to digital to analog (D/A) interfaces 96 and 98 which provide the necessary thyristor firing signals to the units 12 and 14.

Figure 5:
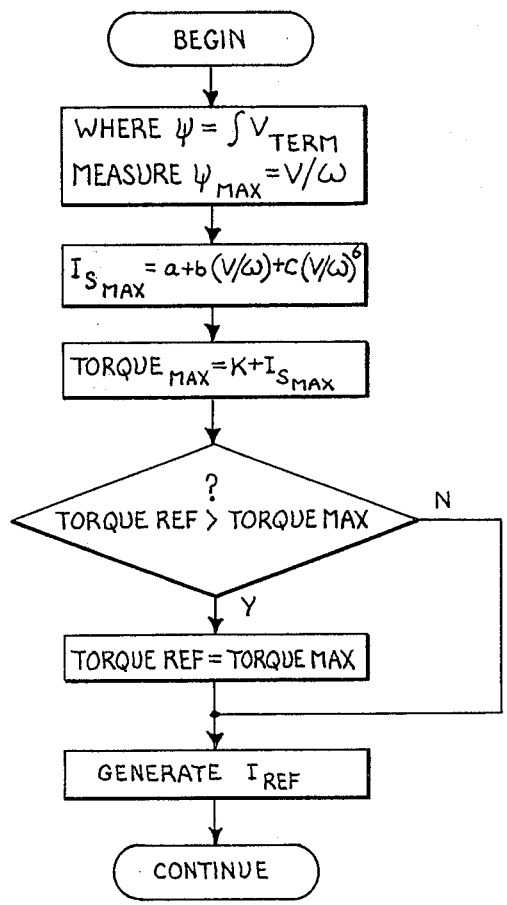
FIG. 5 is a flow chart illustrative of the software for implementing the current limiting function according to the subject invention.

The software required is represented by the flow chart shown in FIG. 5. As shown, when operation begins, the first step implemented is a measurement of the maximum value $\psi_{MAX}$ of the pseudo flux waveform $\psi$ expressed as volts per hertz ($V/\omega$). Following this a function is developed of equation (2) i.e. $I_{smax} = a + b(V/\omega) + c(V/\omega)^6$ from which a predetermined segment is derived in terms of a linear function expressed as Torque$_{max} = K + I_{smax}$, meaning in effect that the torque reference signal is limited to the value necessary to generate the proper stator current for the maximum portion of the curves shown in FIG. 2A. Following this, a query is made as to whether the torque reference signal generated will exceed the maximum torque available from the motor 10. If it is, the torque reference signal will be limited to a value to produce the maximum torque and this signal will next command the generation of the current reference signal $I_{REF}$. In the event that the torque reference signal does not exceed the maximum torque obtainable, the current reference signal $I_{REF}$ is generated accordingly.

Thus what has been shown and described is a technique for limiting the stator current of a polyphase synchronous motor coupled to a load commutated load side converter to a value which produces the peak torque obtainable from the existing operating parameters as determined from the integral of the line to line motor terminal voltage.

While there has been shown and described what are at present considered to be the preferred embodiments of the present invention, modifications thereto will readily occur to those skilled in the art. It is not desired, therefore, that the invention be limited to the specific methods and logic structure shown and described, but it is intended to cover all such modifications, changes and alterations as fall within the true spirit and scope of this invention as defined in the appended claims.

I claim:

1. A method of controlling the torque of a synchronous motor driven by a DC to AC converter coupled to an AC to DC converter via a DC link circuit, comprising the steps of:
   (a) generating a torque reference signal;
   (b) controlling the motor current in response to torque reference signal; and
   (c) limiting the torque reference signal in response to the peak value of the integral of the motor terminal voltage.

2. A method as defined by claim 1 wherein said synchronous motor comprises a polyphase synchronous motor.

3. The method as defined by claim 1 wherein the motor current comprises the stator current of said motor.

4. The method as defined by claim 3 wherein said step of controlling motor current comprises controlling the current in said DC link circuit.

5. The method as defined by claim 4 wherein said step of controlling the DC link circuit comprises controlling said AC to DC converter by said torque reference signal.

6. A method of controlling an AC synchronous motor load in response to a torque reference signal by means of an AC to DC thyristor converter coupled from an AC source to a DC to AC thyristor converter via a DC link circuit and wherein said DC to AC converter supplies power to said motor load comprising the steps of:
   (a) generating a current reference signal and an angle reference signal from said torque reference signal;
   (b) sensing the current in said DC link circuit;
   (c) comparing the current reference signal against the DC link current in a first signal channel and generating a current error signal for controlling the AC to DC converter;
   (d) controlling the DC to AC converter in response to said angle reference signal;
   (e) detecting the peak value of the integral of the motor terminal voltage supplied from said DC to AC converter; and
   (f) limiting the value of said torque reference signal in response to the peak value of the motor stator current.

7. The method as defined by claim 6 wherein the peak value of the stator current is obtained by (i) detecting the motor terminal voltage, (ii) integrating the motor terminal voltage, and (iii) detecting the peak value of the integral of the motor terminal voltage.

8. The method as defined by claim 7 and wherein said motor comprises a polyphase synchronous motor.

9. The method as defined by claim 8 wherein said AC source comprises a polyphase AC source.

10. Apparatus for controlling the torque of a synchronous motor driven by a DC to AC converter coupled to an AC to DC converter via a DC link circuit comprising:
    (a) means for generating a torque reference signal in response to a desired motor speed;
    (b) means for controlling motor current in response to said torque reference signal by the operation of said DC to AC converter and said AC to DC converter in response to said torque reference signal;
    (c) means for determining magnitude of the motor stator current; and
    (d) means for limiting the torque reference signal in response to a predetermined magnitude of the motor stator current.

11. Apparatus for controlling an AC synchronous motor drive system supplying power of a variable current magnitude and frequency to a synchronous motor providing a predetermined rotational motor speed and output torque in response to a desired motor speed, comprising:

(a) means for providing a controlled variable DC current source for providing a DC output which varies in magnitude and response to a first control signal applied thereto;

(b) means for providing a controlled variable AC current source for providing an AC current which varies in frequency to said motor in response to a second control signal applied thereto;

(c) DC link circuit means connecting said DC current source to said AC current source;

(d) means generating a torque reference signal in response to a commanded motor speed;

(e) means generating said first and second control signals in response to the torque reference signal whereby said controlled variable DC current source primarily controls the current supplied to said motor through a DC current supplied to said variable AC current source via said DC link circuit;

(f) means generating a signal which is a function of the stator current of said synchronous motor;

(g) means for determining the peak value of said stator current signal and providing a peak value signal; and (h) means for limiting torque reference signal in response to said peak value signal whereby the torque reference signal is limited to providing the value of the output torque corresponding to the region of peak output torque obtainable for the motor's operating parameters.

12. The apparatus as defined by claim 11 wherein said variable DC current source comprises an AC to DC thyristor converter.

13. The apparatus as defined by claim 11 wherein said variable AC current source comprises a DC to AC converter.

14. The apparatus as defined by claim 13 wherein said DC to AC converter comprises a load commutated inverter.

15. The apparatus as defined by claim 11 wherein said variable DC current source includes an AC to DC thyristor converter coupled to a polyphase AC source.

16. The apparatus as defined by claim 15 and wherein said variable AC current source includes a DC to AC thyristor converter coupled to a polyphase synchronous motor.

17. The apparatus as defined by claim 16 and wherein said polyphase source comprises a three phase source and said polyphase synchronous motor comprises a three phase motor.

18. The apparatus as defined by claim 16 wherein said variable DC current source and said variable AC current source additionally include respective first and second means for controlling the thyristor firing of said AC to DC converter and said DC to AC converter.

19. The apparatus as defined by claim 18 and wherein said first control signal comprises a current reference signal and said second control signal comprises an angle reference signal.

20. The apparatus as defined by claim 19 wherein said current reference signal controls angle of thyristor firing of said AC to DC thyristor converter and wherein said angle reference signal controls the angle of thyristor firing of said DC to AC thyristor converter.

21. The apparatus as defined by claim 11 wherein said means (f) for generating a signal which is a function of the stator current of said motor comprises means for detecting a pseudo flux waveform voltage of said motor, and wherein said means (g) for determining the peak value of said stator current comprises determining the peak value of said flux waveform voltage.

22. The apparatus as defined by claim 11 wherein said means (f) for generating a signal which is a function of the motor stator current comprises (i) means for sensing the motor terminal voltage and (ii) means for integrating the motor terminal voltage, and wherein said means (g) for determining the peak value of said stator current comprises means for determining the peak value of the integral of the motor terminal voltage.

* * * * *

UNITED STATES PATENT AND TRADEMARK OFFICE
CERTIFICATE OF CORRECTION

PATENT NO. : 4,427,934
DATED : January 24, 1984
INVENTOR(S) : Leland C. Tupper

It is certified that error appears in the above-identified patent and that said Letters Patent are hereby corrected as shown below:

Column 1, line 17, delete "306,200" and substitute --300,200--.

Column 4, line 22, delete "≅*" and substitute --$\omega^*$--.

Column 4, line 22, delete "≅M" and substitute --$\omega_M$--.

Column 4, line 40, delete "$I_{f1}$, $I_{f2}$, $I_{33}$" and substitute --$I_{f_1}$, $I_{f_2}$, $I_{f_3}$--.

Signed and Sealed this

Fifteenth Day of May 1984

[SEAL]

Attest:

GERALD J. MOSSINGHOFF

Attesting Officer

Commissioner of Patents and Trademarks